United States Patent
Hayata

(10) Patent No.: US 9,010,914 B2
(45) Date of Patent: *Apr. 21, 2015

(54) INKJET INK COMPOSITION AND INKJET RECORDING METHOD

(75) Inventor: Yuuichi Hayata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 241 days.

This patent is subject to a terminal disclaimer.

(21) Appl. No.: 13/547,488

(22) Filed: Jul. 12, 2012

(65) Prior Publication Data

US 2013/0016166 A1    Jan. 17, 2013

(30) Foreign Application Priority Data

Jul. 12, 2011  (JP) .................................. 2011-153700

(51) Int. Cl.

| | | |
|---|---|---|
| *B41J 2/01* | (2006.01) | |
| *C09D 11/101* | (2014.01) | |
| *B41J 2/21* | (2006.01) | |
| *C09D 11/322* | (2014.01) | |

(52) U.S. Cl.
CPC ............. *C09D 11/101* (2013.01); *B41J 2/2107* (2013.01); *C09D 11/322* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ............. 347/100, 95, 96, 101, 102, 20, 21, 9, 347/88, 99; 106/31.6, 31.13, 31.27; 523/160, 161

See application file for complete search history.

(56) References Cited

U.S. PATENT DOCUMENTS

| | | | | |
|---|---|---|---|---|
| 5,747,597 A | * | 5/1998 | Fujita et al. .................... | 525/312 |
| 2003/0106462 A1 | * | 6/2003 | Yatake et al. ............. | 106/31.59 |
| 2009/0214797 A1 | * | 8/2009 | Kasai ............................. | 427/511 |
| 2009/0244116 A1 | * | 10/2009 | Ohnishi ............................ | 347/6 |
| 2010/0029813 A1 | * | 2/2010 | Deroover et al. ............. | 347/100 |

FOREIGN PATENT DOCUMENTS

| | | | | |
|---|---|---|---|---|
| CN | 101503587 A | 8/2009 | | |
| CN | 101978002 A | 2/2011 | | |
| JP | 2008-248071 A | 10/2008 | | |
| JP | 2009221416 A | * 10/2009 | ................ | B41J 2/01 |
| JP | 2010-180376 A | 8/2010 | | |
| JP | 2011-084643 A | 4/2011 | | |
| WO | WO 2009045703 A1 | * 4/2009 | ................ | B41J 2/01 |

OTHER PUBLICATIONS

Chinese Office Action issued in corresponding Chinese counterpart Application No. 201210241536.3.

* cited by examiner

*Primary Examiner* — Manish S Shah

(74) *Attorney, Agent, or Firm* — Sughrue Mion, PLLC

(57) ABSTRACT

An ink composition is provided that comprises at least (Component A-1) diethylene glycol monobutyl ether acrylate, (Component A-2) at least one compound selected from the group consisting of a compound represented by Formula (1), phenoxyethyl acrylate, isobornyl acrylate, 3,3,5-trimethylcyclohexyl acrylate, and 4-t-butylcyclohexyl acrylate, (Component A-3) an N-vinyllactam and/or tetrahydrofurfuryl acrylate, and (Component B) a polymerization initiator, Component A-1 having a content of 1 to 35 wt % of the entire ink composition, and Components A-1 to A-3 having a total content of 60 to 90 wt % of the entire ink composition

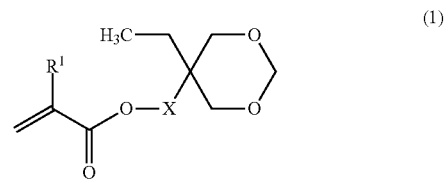

(1)

wherein $R^1$ denotes a hydrogen atom or a methyl group and X denotes a single bond or a divalent linking group.

17 Claims, No Drawings

INKJET INK COMPOSITION AND INKJET RECORDING METHOD

TECHNICAL FIELD

The present invention relates to an inkjet ink composition and an inkjet recording method.

BACKGROUND ART

As image recording methods for forming an image on a recording medium such as paper based on an image data signal, there are an electrophotographic system, sublimation type and melt type thermal transfer systems, an inkjet system, etc.

With regard to the inkjet system, the printing equipment is inexpensive, it is not necessary to use a plate when printing, and since an image is formed directly on a recording medium by discharging an ink composition only on a required image area, the ink composition can be used efficiently and the running cost is low, particularly in the case of small lot production. Furthermore, there is little noise and it is excellent as an image recording system, and has been attracting attention in recent years.

Among them, an inkjet recording ink composition (radiation-curing inkjet recording ink composition), which is curable upon exposure to radiation such as UV rays, is an excellent system from the viewpoint of it being possible to print on various types of recording media because, compared with a solvent-based ink composition, the drying properties are excellent and an image is resistant to spreading since the majority of the components in the ink composition cure upon exposure to radiation such as UV rays.

Examples of a conventional ink composition for inkjet recording are described in JP-A-2011-84643 (JP-A denotes a Japanese unexamined patent application publication), JP-A-2010-180376, and JP-A-2008-248071.

SUMMARY OF INVENTION

It is an object of the present invention to provide an inkjet ink composition that has excellent discharge stability and gives a cured film having excellent substrate adhesion and impact resistance, and an inkjet recording method employing the inkjet ink composition.

The object of the present invention has been attained by means described in <1> and <14>. They are described below together with <2> to <13> and <15>, which are preferred embodiments.

<1> An inkjet ink composition comprising at least (Component A-1) diethylene glycol monobutyl ether acrylate, (Component A-2) at least one compound selected from the group consisting of a compound represented by Formula (1), phenoxyethyl acrylate, isobornyl acrylate, 3,3,5-trimethylcyclohexyl acrylate, and 4-t-butylcyclohexyl acrylate, (Component A-3) an N-vinyllactam and/or tetrahydrofurfuryl acrylate, and (Component B) a polymerization initiator, Component A-1 having a content of 1 to 35 wt % of the entire ink composition, and Components A-1 to A-3 having a total content of 60 to 90 wt % of the entire ink composition

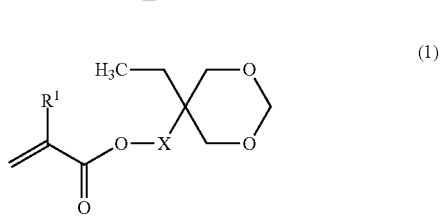

wherein $R^1$ denotes a hydrogen atom or a methyl group and X denotes a single bond or a divalent linking group, <2> the inkjet ink composition according to <1>, wherein it has a surface tension at 25° C. of 33.0 to 39.0 mN/m, <3> the inkjet ink composition according to <1> or <2>, wherein it comprises a compound represented by Formula (1) as Component A-2, <4> the inkjet ink composition according to any one of <1> to <3>, wherein it comprises at least a bisacylphosphine compound and/or a thioxanthone compound as Component B, <5> the inkjet ink composition according to any one of <1> to <4>, wherein it comprises a bisacylphosphine compound and a thioxanthone compound as Component B, <6> the inkjet ink composition according to any one of <1> to <5>, wherein it has a content ratio by weight of Component A-1 and Component A-2 of 1:1 to 1:8, <7> the inkjet ink composition according to any one of <1> to <6>, wherein it comprises cyclic trimethylolpropane formal acrylate as Component A-2, <8> the inkjet ink composition according to any one of <1> to <7>, wherein it comprises cyclic trimethylolpropane formal acrylate and phenoxyethyl acrylate as Component A-2, <9> the inkjet ink composition according to any one of <1> to <8>, wherein it comprises N-vinylcaprolactam as Component A-3, <10> the inkjet ink composition according to any one of <1> to <9>, wherein Component A-1 has a content of 3 to 25 wt % of the entire ink composition, <11> the inkjet ink composition according to any one of <1> to <10>, wherein Component A-2 has a content of 20 to 80 wt % of the entire ink composition, <12> the inkjet ink composition according to any one of <1> to <11>, wherein Component A-3 has a content of 5 to 35 wt % of the entire ink composition, <13> the inkjet ink composition according to any one of <1> to <12>, wherein it further comprises a difunctional (meth)acrylate having a hydrocarbon chain having at least 5 carbons, <14> an inkjet recording method comprising ($a^1$) a step of discharging the inkjet ink composition according to any one of <1> to <13> onto a recording medium and ($b^1$) a step of curing the inkjet ink composition by irradiating the discharged inkjet ink composition with actinic radiation, and <15> the inkjet recording method according to <14>, wherein polyvinyl chloride, an acrylic resin, or an aluminum composite plate is used as the recording medium.

DESCRIPTION OF EMBODIMENTS

The present invention is explained in detail below.
(Inkjet Ink Composition)
The inkjet ink composition of the present invention (hereinafter, also called simply an 'ink composition') comprises at least (Component A-1) diethylene glycol monobutyl ether acrylate, (Component A-2) at least one compound selected from the group consisting of a compound represented by Formula (1), phenoxyethyl acrylate, isobornyl acrylate, 3,3,5-trimethylcyclohexyl acrylate, and 4-t-butylcyclohexyl acrylate, (Component A-3) an N-vinyllactam and/or tetrahydrofurfuryl acrylate, and (Component B) a polymerization initiator, Component A-1 having a content of 1 to 35 wt %, and Components A-1 to A-3 having a total content of 60 to 90 wt %.

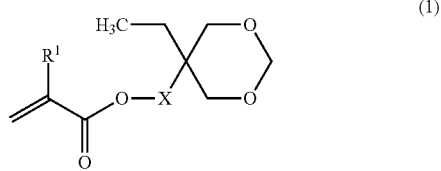

(1)

(In Formula (1), $R^1$ denotes a hydrogen atom or a methyl group and X denotes a single bond or a divalent linking group.)

In addition, in the present invention, the notation 'A to B', which expresses a numerical range, has the same meaning as 'at least A but no greater than B'. Furthermore, '(Component A-1) diethylene glycol monobutyl ether acrylate', etc. may also be simply referred to as 'Component A-1', etc.

Moreover, in the present invention, '(meth)acrylate' denotes acrylate or methacrylate.

The ink composition of the present invention is an oil-based ink composition that can be cured with actinic radiation (also called 'active energy radiation'). The 'actinic radiation' referred to here is radiation that can provide energy that enables an initiating species to be generated in the ink composition when irradiated, and includes α rays, γ rays, X rays, UV, visible light, and an electron beam. Among these, UV and an electron beam are preferable from the viewpoint of curing sensitivity and the availability of equipment, and UV is more preferable.

Due to the ink composition of the present invention comprising in combination Components A-1 to A-3 and Component B, it is possible to obtain an inkjet ink composition that has excellent discharge stability and gives a cured film having excellent substrate adhesion and impact resistance, and an inkjet recording method employing the inkjet ink composition.

It is surmised that the reason why the cured film has excellent impact resistance is that a diethylene glycol monobutyl structure of Component A-1, which is a straight chain structure having a high degree of freedom, absorbs impact to suppress breakage of the cured film.

It is surmised that the reason why the cured film has excellent substrate adhesion is that compounds of Components A-1 to A-3 have high affinity for a substrate (also called a support or a recording medium) such as, in particular, polyvinyl chloride (PVC), an acrylic resin, or an aluminum composite plate (which is paper or plastic plate with aluminum vapor deposited or laminated thereon, and also includes the paper or plastic plate with aluminum vapor deposited or laminated thereon having an outermost surface coated with a polyester resin, etc.), and in addition the hardness of a cured film is high so that an anchoring effect is exhibited, thereby giving high substrate adhesion.

Although the reason is not certain, it is surmised that the reason why the ink composition has excellent discharge stability is that the ink is resistant to being concentrated in the vicinity of a nozzle since the volatility of the ink composition comprising Components A-1 to A-3 in combination is suppressed to a low level, and a stable meniscus is easily formed on a nozzle plate of an inkjet printer head.

The components and values for the physical properties, etc. of the ink composition of the present invention are explained below.

The ink composition of the present invention comprises at least compounds of Components A-1 to A-3, which are explained later; the content of Component A-1 is 1 to 35 wt % of the total weight of the ink composition, and the total content of Components A-1 to A-3 is 60 to 90 wt % of the total weight of the ink composition. A-1 to A-3 are explained below.

(Component A-1) Diethylene Glycol Monobutyl Ether Acrylate

The ink composition of the present invention comprises as Component A-1 diethylene glycol monobutyl ether acrylate (also called 2-(2-butoxyethoxy)ethyl acrylate), which is an acrylate compound having a diethylene glycol monobutyl structure and an ethylenically unsaturated group, represented by Formula (A-1) below. The ink composition of the present invention comprises Component A-1 at 1 to 35 wt % of the total weight of the ink composition. When the content of Component A-1 is less than 1 wt % or exceeds 35 wt %, desired impact resistance, discharge stability, and substrate adhesion cannot be obtained.

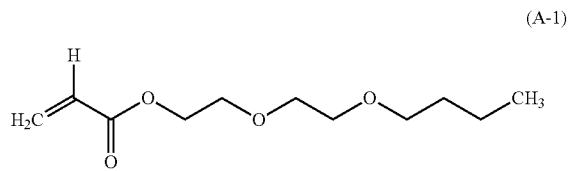

(A-1)

The content of Component A-1 is preferably 3 to 25 wt % of the weight of the entire ink composition, and more preferably 5 to 20 wt %.

Due to Component A-1 being contained, an ink composition that gives a cured film having excellent impact resistance and substrate adhesion, in particular adhesion to an acrylic resin substrate, and that has excellent continuous discharge properties is obtained. It is surmised that the reason why impact resistance is excellent is that the diethylene glycol monobutyl structure of the straight chain structure of Component A-1, which has a high degree of freedom, absorbs impact, thereby suppressing breakage of the cured film.

(Component A-2) at Least One Compound Selected from the Group Consisting of Compound Represented by Formula (1), Phenoxyethyl Acrylate, Isobornyl Acrylate, 3,3,5-Trimethylcyclohexyl Acrylate, and 4-t-Butylcyclohexyl Acrylate The ink composition of the present invention comprises as Component A-2 at least one compound selected from the group consisting of a compound represented by Formula (1), phenoxyethyl acrylate, isobornyl acrylate, 3,3,5-trimethylcyclohexyl acrylate, and 4-t-butylcyclohexyl acrylate.

All the compounds of Component A-2 are monofunctional (meth)acrylate compounds having a cyclic structure moiety in the molecule. Among these (meth)acrylate compounds having a cyclic structure, due to the use of at least one compound selected from the group consisting of a compound represented by Formula (1), phenoxyethyl acrylate, isobornyl acrylate, 3,3,5-trimethylcyclohexyl acrylate, and 4-t-butylcyclohexyl acrylate in combination with A-1 and A-3, an inkjet ink composition that has excellent discharge stability and that gives a cured film having excellent impact resistance and substrate adhesion is obtained.

Component A-2 may employ one type of these compounds or a plurality thereof in combination. It is preferable to use them in combination according to the intended use.

A preferred embodiment of Component A-2 is the combined use of phenoxyethyl acrylate and at least one compound selected from the group consisting of a compound represented by Formula (1), isobornyl acrylate, 3,3,5-trimethylcyclohexyl acrylate, and 4-t-butylcyclohexyl acrylate, and a more preferred embodiment is the combined use of phenoxyethyl acrylate and a compound represented by Formula (1).

<Compound Represented by Formula (1)>

The compound represented by Formula (1) that can be used as Component A-2 of the ink composition of the present invention is explained below.

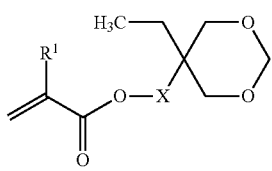

(1)

(In Formula (1), $R^1$ denotes a hydrogen atom or a methyl group and X denotes a single bond or a divalent linking group.)

The compound represented by Formula (1) may be an acrylate compound or a methacrylate compound, but it is preferable that it is an acrylate compound, that is, $R^1$ is a hydrogen atom.

The divalent linking group as X in Formula (1) is not particularly limited as long as the effects of the present invention are not greatly impaired, but is preferably a divalent hydrocarbon group or a divalent linking group formed by combining a hydrocarbon group and at least one bond selected from the group consisting of an ester bond, a urethane bond, a urea bond, an ether bond, and an amide bond.

X is preferably a divalent hydrocarbon group. The divalent hydrocarbon group is preferably a divalent hydrocarbon group having 1 to 20 carbons, and more preferably a divalent hydrocarbon group having 1 to 5 carbons; among the hydrocarbon groups an alkylene group is preferable, and a methylene group, which has 1 carbon, is particularly preferable.

When X is a divalent linking group formed by combining a hydrocarbon group and at least one bond selected from the group consisting of an ester bond, a urethane bond, a urea bond, an ether bond, and an amide bond, the hydrocarbon group is preferably an alkylene group having 1 to 5 carbons. It is preferably a divalent linking group formed by combining at least one alkylene group and at least one bond selected from the group consisting of an ester bond (—COO— or —OCO—), a urethane bond (—NRCOO— or —OCONR— (R denotes a hydrogen atom or an alkyl group)), a urea bond (—NRCONR'— (R and R' denote a hydrogen atom or an alkyl group)), an ether bond (—O—), and an amide bond (—NRCO— or —CONR— (R denotes a hydrogen atom or an alkyl group)). Among these, a divalent linking group formed by combining at least one alkylene group and at least one ether bond is more preferable.

The divalent linking group formed by combining an alkylene group and an ether bond is preferably *-(alkylene group)-O—** or *-(alkylene group)-O-(alkylene group)-** (* denotes the site at which X and the O of the (meth)acryloxy group are bonded, and ** denotes the site at which X and the quaternary carbon atom are bonded).

The divalent linking group formed by combining an alkylene group and an ether bond is preferably a poly(alkyleneoxy) group or poly(alkyleneoxy)alkyl group, which have a plurality of -(alkylene group)-O— moieties, and in this case the total number of carbons in the linking group is preferably 2 to 60, and more preferably 2 to 20.

Specific preferred examples of the compound represented by Formula (1) include, but are not limited to, Compounds (A-2-1) to (A-2-4) shown below.

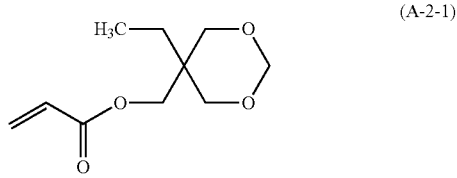

(A-2-1)

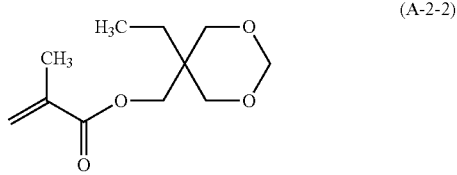

(A-2-2)

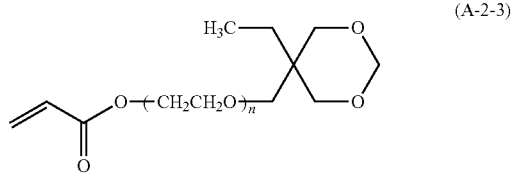

(A-2-3)

n = 1~30

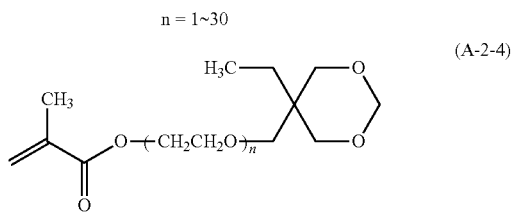

(A-2-4)

n = 1~30

Among them, cyclic trimethylolpropane formal acrylate (A-2-1) and cyclic trimethylolpropane formal methacrylate (A-2-2) are more preferable, and cyclic trimethylolpropane formal acrylate (A-2-1) is particularly preferable.

The content of Component A-2 in the ink composition of the present invention is preferably 20 to 80 wt % relative to the total weight of the ink composition, more preferably 30 to 75 wt %, and particularly preferably 40 to 70 wt %.

The ink composition of the present invention preferably comprises as Component A-2 a compound represented by Formula (1). An ink composition having excellent substrate adhesion to an acrylic resin substrate in particular is obtained. It is preferable for it to comprise cyclic trimethylolpropane formal acrylate in particular as the compound represented by Formula (1). Furthermore, an embodiment in which cyclic trimethylolpropane formal acrylate and phenoxyethyl acrylate are used in combination as Component A-2 is preferable.

The content of the compound represented by Formula (1) is preferably 3 to 70 wt % of the entire ink composition, more preferably 10 to 65 wt %, and particularly preferably 25 to 60 wt %.

The ratio by weight ((Component A-1):(Component A-2)) of Component A-1 and Component A-2 in the ink composition of the present invention is preferably 1:1 to 1:8, more preferably 1:2 to 1:8, and yet more preferably 1:4 to 1:7.

(Component A-3) N-Vinyllactam and/or Tetrahydrofurfuryl Acrylate

The ink composition of the present invention comprises as Component A-3 an N-vinyllactam and/or tetrahydrofurfuryl acrylate.

The compound as Component A-3 is a polymerizable compound having a cyclic structure in the molecule and a relatively small molecular weight, and due to it being contained an ink composition having good curability is obtained. The compound as Component A-3 preferably has a molecular weight of no greater than 160.

N-vinyllactams that can be used as Component A-3 are explained below.

<N-vinyllactam>

The ink composition of the present invention preferably comprises an N-vinyllactam as Component A-3. An N-vinyllactam is preferably a compound represented by Formula (a).

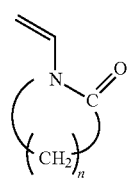

(a)

In Formula (a), n denotes an integer of 2 to 6; n is preferably an integer of 3 to 5 from the viewpoint of flexibility after the ink composition is cured, adhesion to a recording medium, and ready availability of starting materials, n is more preferably 3 or 5, and n is particularly preferably 5, which is N-vinylcaprolactam. N-vinylcaprolactam is preferable since it has excellent safety, is commonly used and is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring.

The compound represented by Formula (a) may be used singly or in a combination of two or more compounds.

<Tetrahydrofurfuryl Acrylate>

The ink composition of the present invention preferably comprises tetrahydrofurfuryl acrylate as Component A-2. Tetrahydrofurfuryl acrylate is the compound represented by Formula (a-2).

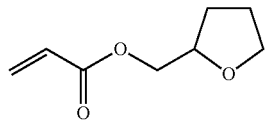

(a-2)

The content of Component A-3 in the ink composition of the present invention, that is, the total content of an N-vinyllactam and tetrahydrofurfuryl acrylate, is preferably 5 to 35 wt % relative to the total weight of the ink composition, more preferably 8 to 24 wt %, yet more preferably 9 to 20 wt %, and particularly preferably 10 to 18 wt %. When in the above-mentioned range, the curability of the interior of a printed material is strongly promoted, and an ink composition that has excellent curability and substrate adhesion is obtained.

In the present invention, the ink composition comprises an N-vinyllactam and/or tetrahydrofurfuryl acrylate as Component A-3, and Component A-3 may employ one type of these compounds or a plurality thereof in combination. It is preferable to use one type thereof, and more preferable to use an N-vinyllactam on its own.

The total content of Components A-1 to A-3 in the ink composition of the present invention is 60 to 90 wt % of the entire ink composition, more preferably 65 to 90 wt %, and yet more preferably 70 to 90 wt %.

When in the above-mentioned range, the ink composition has excellent discharge stability and excellent affinity for a support substrate, and an ink composition having excellent substrate adhesion toward PVC, an acrylic resin, an aluminum composite plate, etc. in particular is obtained.

<Other Polymerizable Compound>

The ink composition of the present invention may comprise a polymerizable compound other than Components A-1 to A-3.

The other polymerizable compound is not particularly limited but is preferably an ethylenically unsaturated compound.

As the other polymerizable compound, a known polymerizable compound may be used, and examples thereof include a (meth)acrylate compound, a vinyl ether compound, an allyl compound, an N-vinyl compound, and an unsaturated carboxylic acid other than Components A-1 to A-3. Specific examples thereof include radically polymerizable monomers described in JP-A-2009-221414, polymerizable compounds described in JP-A-2009-209289, and ethylenically unsaturated compounds described in JP-A-2009-191183.

The ink composition of the present invention may preferably employ a difunctional (meth)acrylate compound in addition to Components A-1 to A-3. The difunctional (meth)acrylate compound is preferably a difunctional (meth)acrylate compound having an optionally branched hydrocarbon chain having at least 5 carbons.

Preferred examples of the difunctional (meth)acrylate compound include a difunctional (meth)acrylate compound having a hydrocarbon chain having at least 5 carbons in the molecule, and specific examples thereof include neopentyl glycol di(meth)acrylate, a propylene oxide (PO)-modified neopentyl glycol di(meth)acrylate, hexanediol di(meth)acrylate, a PO-modified hexanediol di(meth)acrylate, nonanediol di(meth)acrylate, decanediol di(meth)acrylate, dodecanediol di(meth)acrylate, tridecanediol di(meth)acrylate, octadecanediol di(meth)acrylate, 3-methyl-1,5-pentanediol di(meth)acrylate, 2-n-butyl-2-ethyl-1,3-propanediol di(meth)acrylate, cyclohexanedimethanol di(meth)acrylate, and cyclohexanediol di(meth)acrylate. Among them, a PO-modified neopentyl glycol di(meth)acrylate is particularly preferable.

The content of the difunctional (meth)acrylate compound having a hydrocarbon chain having at least 5 carbons in the molecule is preferably 1 to 30 wt % of the entire ink composition, more preferably 2 to 20 wt %, and yet more preferably 3 to 10 wt %. It is preferable for the content to be in the above-mentioned range since the occurrence of image unevenness is suppressed, and substrate adhesion and impact resistance of a cured film are excellent.

The ink composition of the present invention may employ a tri- or higher-functional (meth)acrylate compound as a polymerizable compound. Preferred examples of trifunctional (meth)acrylate compound include pentaerythritol tri(meth)acrylate, trimethylolethane tri(meth)acrylate, and trimethylolpropane tri(meth)acrylate. Preferred examples of a tetrafunctional (meth)acrylate compound include pentaerythritol tetra(meth)acrylate and dipentaerythritol tetra(meth)acrylate.

Examples of other polyfunctional (meth)acrylates include bis(4-(meth)acryloxypolyethoxyphenyl)propane, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, and 2,2-bis(4-(meth)acryloxypolyethoxyphenyl)propane.

The other polymerizable compound may employ an aromatic group-containing monofunctional (meth)acrylate compound other than phenoxyethyl acrylate. The ring structure of the aromatic group of the aromatic group-containing monofunctional (meth)acrylate compound may contain a heteroatom such as O, N, or S.

As the aromatic ring structure of the aromatic group-containing monofunctional (meth)acrylate compound, there can be cited as a preferred example a ring structure selected from the group consisting of naphthalene, anthracene, indene, fluorene, 1H-phenalene, phenanthrene, triphenylene, pyrene, naphthacene, tetraphene, biphenyl, as-indacene, s-indacene, acenaphthylene, fluoranthene, acephenanthrylene, aceanthrylene, chrysene, pleiadene, furan, thiophene, pyrroline, pyrazoline, imidazoline, isooxazoline, isothiazoline, pyridine, pyridazine, pyrimidine, pyrazine, triazole, and tetrazole.

Examples of the other polymerizable compound include unsaturated carboxylic acids such as acrylic acid, methacrylic acid, itaconic acid, crotonic acid, isocrotonic acid, and maleic acid, and salts thereof, an ethylenically unsaturated group-containing anhydride, acrylonitrile, styrene and, furthermore, radically polymerizable compounds such as various types of unsaturated polyesters, unsaturated polyethers, unsaturated polyamides, and unsaturated urethane.

Examples of other polymerizable compound include 2-ethylhexyl(meth)acrylate, 2-hydroxyethyl(meth)acrylate, butoxyethyl(meth)acrylate, carbitol(meth)acrylate, cyclohexyl(meth)acrylate, benzil(meth)acrylate, methyl(meth)acrylate, n-buthyl(meth)acrylate, allyl(meth)acrylate, glycidyl(meth)acrylate, dimethylaminomethyl(meth)acrylate, oligoester(meth)acrylate, N-methylol(meth)acrylamide, diacetone(meth)acrylamide, and (meth)acrylic acid derivatives such as epoxy(meth)acrylate, allyl compound derivatives such as allyl glycidyl ether, diallyl phthalate, triallyl trimellitate, etc.

More specifically, commercially available or industrially known radically polymerizable or crosslinking monomers, oligomers, and polymers, such as those described in 'Kakyozai Handobukku' (Crosslinking Agent Handbook), Ed. S. Yamashita (Taiseisha, 1981); 'UV/EB Koka Handobukku (Genryo)' (UV/EB Curing Handbook (Starting Materials)) Ed. K. Kato (Kobunshi Kankoukai, 1985); 'UV/EB Koka Gijutsu no Oyo to Shijyo' (Application and Market of UV/EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

The molecular weight of the other polymerizable monomer is preferably 80 to 2,000, more preferably 80 to 1,000, and yet more preferably 80 to 800.

Furthermore, as the other polymerizable compound, it is preferable to use a monofunctional vinyl ether compound.

Examples of the monofunctional vinyl ether compound that are preferably used include ethylene glycol monovinyl ether, triethylene glycol monovinyl ether, hydroxyethyl monovinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, hydroxynonyl monovinyl ether, cyclohexanedimethanol monovinyl ether, n-propyl vinyl ether, isopropyl vinyl ether, dodecyl vinyl ether, and diethylene glycol monovinyl ether.

Furthermore, a polyfunctional vinyl ether can be used. Examples of polyfunctional vinyl ether compounds that are preferably used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether.

When the ink composition of the present invention comprises a polymerizable compound other than Components A-1 to A-3, the content of the other polymerizable compound in the ink composition of the present invention is preferably 0.1 to 30 wt % relative to the total weight of the ink composition, more preferably 1 to 25 wt %, and particularly preferably 1.5 to 15 wt %.

<Surface Tension of Ink Composition>

The ink composition of the present invention preferably has a surface tension at 25° C. of 33.0 to 39.0 mN/m, more preferably 34.0 to 39.0 mN/m, and particularly preferably 36.0 to 39.0 mN/m.

When the surface tension at 25° C. is in the above-mentioned range, excellent discharge stability and excellent substrate adhesion can be obtained.

With regard to a method for measuring the surface tension of the ink composition, a method in which measurement is carried out by a ring method using a normal surface tensiometer (e.g. a SIGMA 702 surface tensiometer, KSV INSTRUMENTS LTD, etc.), at a liquid temperature of 25° C. can be cited as an example.

(Component B) Polymerization Initiator

The ink composition of the present invention comprises (Component B) a polymerization initiator. An ink composition discharged onto a support is cured by irradiating with actinic radiation. This is due to the polymerization initiator contained in the ink composition of the present invention undergoing decomposition by irradiation with actinic radiation to thus generate a polymerization-initiating species such as a radical, and the initiating species functioning to cause and promote a polymerization reaction of a polymerizable compound.

The polymerization initiator in the present invention includes not only a compound that generates a polymerization-initiating species by absorbing external energy such as actinic radiation but also a compound that promotes decomposition of a polymerization initiator by absorbing specific actinic radiation (a so-called sensitizer). If a sensitizer is present together with the polymerization initiator in the ink composition of the present invention, the sensitizer in the system absorbs actinic radiation to thus attain an excited state and comes into contact with the polymerization initiator to promote decomposition of the polymerization initiator, thereby enabling a more sensitive curing reaction to be achieved. Examples of the sensitizer include those described in JP-A-2008-208190.

The polymerization initiator is a polymerization initiator that is used in a radical polymerization reaction, and the ink composition of the present invention preferably comprises at least (Component B-1) a bisacylphosphine compound, or (Component B-2) a thioxanthone compound, as a polymerization initiator. In accordance with the initiator, Components A-1 to A-3 being combined, an ink composition has excellent discharge stability, and can give an image having excellent substrate adhesion.

Bisacylphosphine compounds and thioxanthone compounds are explained below.

<(Component B-1) Bisacylphosphine Compound>

(Component B-1) The bisacylphosphine compound is not particularly limited; a known compound may be used, and a compound represented by Formula (b-1) below is preferable.

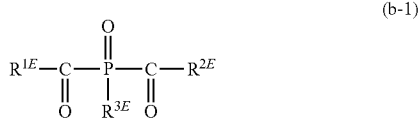

(b-1)

(In Formula (b-1), $R^{1E}$, $R^{2E}$, and $R^{3E}$ independently denote an aromatic hydrocarbon group that may have a methyl group or an ethyl group as a substituent.)

As the bisacylphosphine compound, a known bisacylphosphine oxide compound may be used. Examples thereof include bisacylphosphine oxide compounds described in JP-A-3-101686, JP-A-5-345790, and JP-A-6-298818.

Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among them, the bisacylphosphine compound is preferably bis(2,4,6-trimethylbenzoyl)phenylphosphine oxide (IRGACURE 819: BASF Japan), bis(2,6-dimethoxybenzoyl)-2,4,4-trimethylpentylphenylphosphine oxide, etc.

The content of Component B-1 is preferably 2 to 9 wt % relative to the weight of the entire ink composition, and more preferably 2.5 to 8.5 wt %.

<(Component B-2) Thioxanthone Compound>

The ink composition of the present invention may preferably comprise (Component B-2) a thioxanthone compound.

The thioxanthone compound is not particularly limited; a known compound may be used, and a compound represented by Formula (b-2) below is preferable.

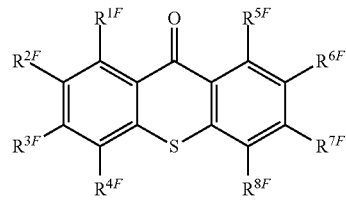

(b-2)

In Formula (b-2) above, $R^{1F}$, $R^{2F}$, $R^{3F}$, $R^{4F}$, $R^{5F}$, $R^{6F}$, $R^{7F}$, and $R^{8F}$ independently denote a hydrogen atom, an alkyl group, a halogen atom, a hydroxy group, a cyano group, a nitro group, an amino group, an alkylthio group, an alkylamino group (The alkylamino group includes the case of monoalkylsubstituted amino group and dialkylsubstituted amino group. It is same also in the following.), an alkoxy group, an alkoxycarbonyl group, an acyloxy group, an acyl group, a carboxy group, or a sulfo group. The number of carbon atoms of an alkyl moiety in the alkyl group, alkylthio group, alkylamino group, alkoxy group, alkoxycarbonyl group, acyloxy group, and acyl group is preferably 1 to 20, more preferably 1 to 8, and yet more preferably 1 to 4.

Two of $R^{1F}$, $R^{2F}$, $R^{3F}$, $R^{4F}$, $R^{5F}$, $R^{6F}$, $R^{7F}$, and $R^{8F}$ that are adjacent may be joined to each other to form a ring. When they form a ring, examples of the ring structure include a 5- or 6-membered aliphatic or aromatic ring; it may be a heterocyclic ring containing an element other than a carbon atom, and rings thus formed may be further combined to form a bicyclic ring, for example a fused ring. These ring structures may further have a substituent. Examples of the substituent include a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, and a sulfo group. Examples of a heteroatom when the resulting ring structure is a heterocyclic ring include N, O, and S.

Examples of the thioxanthone compound include thioxanthone, 2-isopropylthioxanthone, 4-isopropylthioxanthone, 2-chlorothioxanthone, 2-dodecylthioxanthone, 2,4-dichlorothioxanthone, 2,3-diethylthioxanthone, 1-chloro-4-propoxythioxanthone, 2-cyclohexylthioxanthone, 4-cyclohexylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, N-allylthioxanthone-3,4-dicarboximide, N-n-octylthioxanthone-3,4-dicarboxyimide, N-(1,1,3,3-tetramethylbutyl)thioxanthone-3,4-dicarboxyimide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propanaminium chloride. Among them, from the viewpoint of ready availability and curability, thioxanthone, 2,3-diethylthioxanthone, 2,4-diethylthioxanthone, 2,4-dichlorothioxanthone, 1-chloro-4-propoxythioxanthone, 2-cyclohexylthioxanthone, 4-cyclohexylthioxanthone, 2-isopropylthioxanthone, and 4-isopropylthioxanthone are preferable, and 2-isopropylthioxanthone and 4-isopropylthioxanthone are more preferable.

The content of Component B-2 is preferably 0.1 to 7.0 wt % of the entire ink composition, and more preferably 0.5 to 5.0 wt %.

<(Component B-3) α-Hydroxyketone Compound>

The ink composition of the present invention may preferably comprise (Component B-3) an a-hydroxyketone compound, as (Component B) the polymerization initiator.

Examples of the a-hydroxyketone compound include 1-[4-(2-hydroxyethoxy)phenyl]-2-hydroxy-2-methyl-1-propan-1-one, 2-hydroxy-2-methyl-1-phenylpropan-1-one, and 1-hydroxycyclohexyl phenyl ketone. Among them, 1-hydroxycyclohexyl phenyl ketone compound is preferable. The α-hydroxyketone compound is preferably an 1-hydroxycyclohexyl phenyl ketone compound. The 1-hydroxycyclohexyl phenyl ketone compound referred to in the present invention comprises a compound obtained by substituting 1-hydroxycyclohexyl phenyl ketone with any substituent. The substituent may be selected freely from a range that enables an ability as a radical polymerization initiator to be exhibited, and specific examples thereof include an alkyl group having 1 to 4 carbons. Among them, 1-hydroxycyclohexyl phenyl ketone (IRGACURE 184: BASF Japan) is more preferable.

The content of Component B-3 is preferably 1.0 to 5.0 wt % of the entire ink composition, and more preferably 2.0 to 4.0 wt %.

A preferred embodiment of Component B in the present invention is for it to comprise at least one of Components B-1 to B-3, more preferably Components B-1 and B-2, and yet more preferably all of Components B-1 to B-3.

The total content of Component B in the present invention is preferably 5.0 to 11.0 wt % of the entire ink composition, more preferably 6.0 to 10.0 wt %, and yet more preferably 7.0 to 9.0 wt %.

When in the above-mentioned range, due to the combined use thereof with Components A-1 to A-3, the ink composition has excellent discharge stability and excellent affinity for a support (substrate), and an ink composition having excellent substrate adhesion to PVC, an acrylic resin, an aluminum composite plate, etc. in particular is obtained.

The ink composition of the present invention may comprise other polymeriation initiator other than Components B-1 to B-3. Examples of the other polymerization initiator include a monoacylphosphine compound, a-aminoalkylketone, an aromatic ketone, an aromatic onium salt compound, an organic peroxide, a thio compound, a hexaarylbiimidazole compound, a ketoxime ester compound, a borate compound, an azinium compound, a metallocene compound, an active ester compound, and a compound having a carbon-halogen bond.

Details of the above-mentioned polymerization initiators are known to a person skilled in the art, and are described in for example paragraphs 0090 to 0116 of JP-A-2009-185186.

<Colorant>

The ink composition of the present invention may preferably contain a colorant in order to improve the visibility of a formed image area. The colorant is not particularly limited, but a pigment and an oil-soluble dye that have excellent weather resistance and rich color reproduction are preferable, and it may be selected from any known coloring agent such as a soluble dye. It is preferable that the colorant does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, C.I. Pigment Red 3 (is also called 'Pigment Red 3'), 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 202, 208, 216, 226, or 257, C.I. Pigment Violet 3 (is also called 'Pigment Violet 3'), 19, 23, 29, 30, 37, 50, or 88, and C.I. Pigment Orange 13 (is also called 'Pigment Orange 13'), 16, 20, or 36; as a blue or cyan pigment, C.I. Pigment Blue 1 (is also called 'Pigment Blue 1'), 15, 15:1, 15:2, 15:3, 15:4, 15:6, 16, 17:1, 22, 27, 28, 29, 36, or 60; as a green pigment, C.I. Pigment Green 7 (is also called 'Pigment Green 7'), 26, 36, or 50; as a yellow pigment, C.I. Pigment Yellow 1 (is also called 'Pigment Yellow 1'), 3, 12, 13, 14, 17, 34, 35, 37, 55, 74, 81, 83, 93, 94, 95, 97, 108, 109, 110, 120, 137, 138, 139, 150, 153, 154, 155, 157, 166, 167, 168, 180, 185, or 193; as a black pigment, C.I. Pigment Black 7 (is also called 'Pigment Black 7'), 28, or 26; as a white pigment, C.I. Pigment White 6 (is also called 'Pigment White 6'), 18, or 21, etc. may be used according to the intended application.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include C.I. Disperse Yellow 5, 42, 54, 64, 79, 82, 83, 93, 99, 100, 119, 122, 124, 126, 160, 184:1, 186, 198, 199, 201, 204, 224, and 237; C.I. Disperse Orange 13, 29, 31:1, 33, 49, 54, 55, 66, 73, 118, 119, and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C.I. Disperse Green 6:1 and 9.

The colorant is preferably added to the ink composition and then dispersed in the ink composition to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

In the preparation of an ink composition, the colorant may be added directly to the ink composition together with other components. Furthermore, in order to improve dispersibility it may be added in advance to a solvent or a dispersing medium such as a polymerizable compound used in the present invention, homogeneously dispersed or dissolved, and then added to the ink composition.

In the present invention, in order to avoid the problem of the solvent resistance being degraded when the solvent remains in the cured image and the VOC (Volatile Organic Compound) problem of the residual solvent, it is preferable to add in advance the colorant to the dispersing medium such as the polymerizable compound. That is, it is preferable that the ink composition does not comprise the solvent. As a polymerizable compound used as the dispersing medium of the colorant, it is preferable in terms of dispersion suitability to select a monomer having the low viscosity. The colorants may be used by appropriately selecting one type or two or more types thereof according to the intended purpose of the ink composition.

When a colorant such as a pigment that is present as a solid in the ink composition is used, it is preferable for the colorant, the dispersant, the dispersing medium, dispersion conditions, and filtration conditions to be set so that the average particle size of colorant particles is preferably 0.005 to 0.5 μm, more preferably 0.01 to 0.45 μm, and yet more preferably 0.015 to 0.4 μm. It is preferable for the colorant to control its particle size, since clogging of a head nozzle can be suppressed and the storage stability, transparency, and curing sensitivity of the ink composition can be maintained.

The content of the colorant in the ink composition is appropriately selected according to the color and the intended purpose, and is preferably 0.01 to 30 wt % relative to the weight of the entire ink composition.

<Dispersant>

The ink composition of the present invention preferably comprises a dispersant. In particular, when the pigment is used, the ink composition preferably comprises a dispersant in order to stably disperse the pigment in the ink composition. As the dispersant that can be used in the present invention, a polymeric dispersant is preferable. The 'polymeric dispersant' referred to in the present invention means a dispersant having a weight-average molecular weight of 1,000 or greater.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives); Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation); Ionet S-20 (manufactured by Sanyo Chemical Industries, Ltd.); and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is preferably 0.05 to 15 wt % relative to the weight of the entire ink composition.

<Surfactant>

It is preferable that the ink composition of the present invention comprises neither a silicone-based surfactant nor a fluorine-based surfactant or comprises a total content of silicone-based and fluorine-based surfactants of less than 0.01 wt % relative to the total weight of the ink composition. It is more preferable that the ink composition comprises neither a silicone-based surfactant nor a fluorine-based surfactant or comprises the total content of the both surfactants of no greater than 0.005 wt %, and particularly preferable that the ink composition comprises neither a silicone-based surfactant nor a fluorine-based surfactant.

As a surfactant other than a silicone-based and a fluorine-based surfactants, those described in JP-A-62-173463 and JP-A-62-183457 can be cited. Examples thereof include an anionic surfactant such as a dialkyl sulfosuccinate salt, an alkylnaphthalene sulfonic acid salt, or a fatty acid salt, a nonionic surfactant such as a polyoxyethylene alkyl ether, a polyoxyethylene alkyl allyl ether, an acetylene glycol, or a polyoxyethylene-polyoxypropylene block copolymer, and a cationic surfactant such as an alkylamine salt or a quaternary ammonium salt.

In addition, it is preferable that the ink composition of the present invention also comprises no surfactant other than silicone-based and fluorine-based surfactants or comprises a total content of the surfactant other than silicone-based and fluorine-based surfactants of less than 0.01 wt % relative to the total weight of the ink composition. It is more preferable that the ink composition comprises no surfactant other than silicone-based and fluorine-based surfactants or comprises the total content of the surfactants of no greater than 0.005 wt %, and particularly preferable that the ink composition comprises no surfactant other than silicone-based and fluorine-based surfactants.

<Oligomer>

The ink composition of the present invention may comprises an oligomer.

An oligomer is generally a polymer in which a limited number (usually 5 to 100) of monomers are bonded, and known compounds called oligomers may be selected freely, but in the present invention it is preferable to select a polymer having a weight-average molecular weight of 400 to 10,000 (more preferably 500 to 5,000).

The oligomer may have a radically polymerizable group. The radically polymerizable group is preferably an ethylenically unsaturated group, and more preferably a (meth)acryloxy group.

The oligomer in the present invention may be any oligomer, and examples thereof include an olefin-based oligomer (an ethylene oligomer, a propylene oligomer, a butene oligomer, etc.), a vinyl-based oligomer (a styrene oligomer, a vinyl alcohol oligomer, a vinylpyrrolidone oligomer, an acrylate oligomer, a methacrylate oligomer, etc.), a diene-based oligomer (a butadiene oligomer, a chloroprene rubber, a pentadiene oligomer, etc.), a ring-opening polymerization type oligomer (di-, tri-, tetraethylene glycol, polyethylene glycol, polyethylimine, etc.), an addition-polymerization type oligomer (an oligoester acrylate, a polyamide oligomer, a polyisocyanate oligomer), and an addition-condensation oligomer (a phenolic resin, an amino resin, a xylene resin, a ketone resin, etc.). Among them an oligoester (meth)acrylate is preferable, and among them a urethane(meth)acrylate, a polyester(meth)acrylate, and an epoxy(meth)acrylate are preferable, and a urethane(meth)acrylate is more preferable.

As the urethane(meth)acrylate, an aliphatic urethane (meth)acrylate and an aromatic urethane(meth)acrylate may preferably be cited, and an aliphatic urethane(meth)acrylate may more preferably be cited.

Furthermore, the urethane(meth)acrylate is preferably a tetra- or lower-functional urethane(meth)acrylate, and more preferably a di- or lower-functional urethane(meth)acrylate.

In accordance with a urethane(meth)acrylate being contained, an ink composition having excellent adhesion to a substrate and excellent curability is obtained.

With respect to the oligomer, 'Origomar Handobukku (Oligomer Handbook)' (edited by Junji Furukawa, The Chemical Daily Co., Ltd.) may also be referred to.

As oligomer commercial products, examples of urethane (meth)acrylates include R1204, R1211, R1213, R1217, R1218, R1301, R1302, R1303, R1304, R1306, R1308, R1901, and R1150 manufactured by Dai-Ichi Kogyo Seiyaku Co., Ltd., the EBECRYL series (e.g. EBECRYL 230, 270, 4858, 8402, 8804, 8807, 8803, 9260, 1290, 1290K, 5129, 4842, 8210, 210, 4827, 6700, 4450, and 220) manufactured by Daicel-Cytec Company Ltd., NK Oligo U-4HA, U-6HA, U-15HA, U-108A, and U200AX manufactured by Shin-Nakamura Chemical Co., Ltd., and Aronix M-1100, M-1200, M-1210, M-1310, M-1600, and M-1960 manufactured by Toagosei Co., Ltd., and CN964 and A85 manufactured by Sartomer.

Examples of polyester (meth)acrylates include the EBECRYL series (e.g. EBECRY L770, IRR467, 81, 84, 83, 80, 675, 800, 810, 812, 1657, 1810, IRR302, 450, 670, 830, 870, 1830, 1870, 2870, IRR267, 813, IRR483, 811, etc.) manufactured by Daicel-Cytec Company Ltd. and Aronix M-6100, M-6200, M-6250, M-6500, M-7100, M-8030, M-8060, M-8100, M-8530, M-8560, and M-9050 manufactured by Toagosei Co., Ltd.

Examples of epoxy(meth)acrylates include the EBECRYL series (e.g. EBECRYL 600, 860, 2958, 3411, 3600, 3605, 3700, 3701, 3703, 3702, 3708, RDX63182, 6040, etc.) manufactured by Daicel-Cytec Company Ltd.

With regard to the oligomer, one type thereof may be used on its own or two or more types may be used in combination.

The content of the oligomer in the ink composition of the present invention is, relative to the total weight of the ink composition, preferably 0.1 to 50 wt %, more preferably 0.5 to 20 wt %, and yet more preferably 1 to 10 wt %.

<Other Components>

The ink composition of the present invention may comprise as necessary, in addition to the above-mentioned components, a co-sensitizer, a UV absorber, an antioxidant, an antifading agent, a conductive salt, a solvent, a basic compound, etc. As these other components a known component may be used. Examples thereof include components described in JP-A-2009-221416.

Furthermore, from the viewpoint of storage properties and suppression of head clogging, the ink composition of the present invention preferably comprises a polymerization inhibitor.

The content of the polymerization inhibitor is preferably at 200 ppm to 1.0 wt % relative to the total weight of the ink composition of the present invention.

Examples of the polymerization inhibitor include a nitroso-based polymerization inhibitor, a hindered amine-based polymerization inhibitor, hydroquinone, benzoquinone, p-methoxyphenol, TEMPO, TEMPOL, and Al cupferron.

(Inkjet Recording Method, Inkjet Recording Device, and Printed Material)

The inkjet recording method of the present invention is a method for forming an image by discharging the ink composition of the present invention onto a recording medium (support, recording material, etc.) for inkjet recording and curing the ink composition by irradiating the ink composition so discharged onto the recording medium with actinic radiation (is also called 'actinic energy ray').

More specifically, the inkjet recording method of the present invention preferably comprises ($a^1$) a step of discharging the ink composition of the present invention onto a recording medium, and ($b^1$) a step of curing the ink composition by irradiating the discharged ink composition with actinic radiation.

Due to the inkjet recording method of the present invention comprising steps ($a^1$) and ($b^1$) above, an image is formed by the ink composition cured on the recording medium.

Furthermore, the printed material of the present invention is a printed material recorded by the inkjet recording method of the present invention.

In the step ($a^1$) in the inkjet recording method of the present invention, an inkjet recording device described in detail below may be used.

<Inkjet Recording Device>

The inkjet recording device used in the inkjet recording method of the present invention is not particularly limited, and any known inkjet recording device that can achieve an intended resolution may be used. That is, any known inkjet recording device, such as a commercial product, may be selected and used in order to discharge an ink composition onto the recording medium (support) in the step ($a^1$) of the inkjet recording method of the present invention.

The inkjet recording device that can be used in the present invention is equipped with, for example, an ink supply system, a temperature sensor, and an actinic radiation source.

The ink supply system comprises, for example, a main tank containing the ink composition of the present invention, a supply pipe, an ink composition supply tank immediately before an inkjet head, a filter, and a piezo system inkjet head. The piezo system inkjet head may be driven so as to discharge a multisize dot of preferably 1 to 100 pL, and more preferably 8 to 30 pL, at a resolution of preferably 320×320 to 4,000× 4,000 dpi, more preferably 400×400 to 1,600×1,600 dpi, and yet more preferably 720×720 dpi. Here, dpi referred to in the present invention means the number of dots per 2.54 cm.

As described above, since it is desirable for the ink composition to be discharged at a constant temperature, the inkjet recording device is preferably equipped with a temperature stabilizer for stabilizing the temperature of the ink composition. Parts to be controlled to a constant temperature include all of the supply pipe system and the members from the ink tank (including an intermediate tank if it is provided) to the discharging face of the nozzle. A section from the ink supply tank to the inkjet head is thermally insulated and heated.

A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. A viscosity at 25° C. of the ink composition is preferably no greater than 50 mPa·s. When in the above-mentioned range, good discharge stability can be obtained. By using the above-mentioned method, high discharge stability can be achieved.

The radiation curing type ink composition such as the ink composition of the present invention generally has a viscosity that is higher than that of a water-based ink composition normally used for an inkjet recording ink composition, and variation in viscosity due to a change in temperature at the time of discharge is large. Viscosity variation in the ink composition has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature of ink composition is preferably ±5° C. of a set temperature, more preferably ±2° C. of the set temperature, and yet more preferably ±1° C. of the set temperature.

The inkjet head used in the inkjet recording method of the present invention is preferably an inkjet head having a nozzle plate with a face on the ink discharge side treated so as to have affinity for an ink.

As the inkjet head having a nozzle plate with a face on the ink discharge side treated so as to have affinity for an ink, for example, an on-demand inkjet head of a piezo drive system manufactured by FUJIFILM Dimatix, Inc. can be cited. Specific examples thereof include S-class and Q-class Sapphire.

The nozzle plate is preferably a nozzle plate with a face on the ink discharge side treated so as to have affinity for an ink, may be one in which at least part of the face on the ink discharge side has been treated so as to have affinity for an ink, and is preferably one in which the entire face on the ink discharge side has been treated so as to have affinity for an ink.

As a method for ink affinity treatment, there can be cited a method in which at least one non-ink repelling layer is formed on at least part of the surface of a nozzle plate.

Specifically, the nozzle plate preferably comprises, on at least part of the face on the ink discharge side, a layer formed from at least one type selected from the group consisting of gold, stainless steel, iron, titanium, tantalum, platinum, rhodium, nickel, chromium, silicon oxide, silicon nitride, and aluminum nitride, more preferably a layer formed from at least one type selected from the group consisting of gold, stainless steel, iron, titanium, silicon oxide, silicon nitride, and aluminum nitride, yet more preferably a layer formed from at least one type selected from the group consisting of gold, stainless steel, and silicon oxide, and particularly preferably a layer formed from silicon oxide.

As the method for ink affinity treatment, a known method may be used, and examples thereof include, but are not limited to, (1) a method in which a silicon oxide film is formed by thermally oxidizing the surface of a nozzle plate made of silicon, (2) a method in which an oxide film of silicon or a material other than silicon is oxidatively formed or a method in which it is formed by sputtering, and (3) a method in which a metal film is formed. Details of these methods may be referred to in US Pat. Application Publication No. 2010/0141709.

Then (b$^1$) a step of curing the ink composition by irradiating the discharged ink composition with actinic radiation is explained.

The ink composition discharged onto the recording medium cures upon exposure to actinic radiation. This is due to an initiating species such as a radical being generated by decomposition of the photopolymerization initiator contained in the ink composition of the present invention by irradiation with actinic radiation, the initiating species functioning so as to make a polymerization reaction of a polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizer, the peak wavelength of the actinic radiation is preferably 200 to 600 nm, more preferably 300 to 450 nm, yet more 320 to 420 nm, and particularly preferably 340 to 400 nm.

Furthermore, in the present invention, the photopolymerization initiation system has sufficient sensitivity for low output actinic radiation. The actinic radiation for curing is applied therefore so that the illumination intensity on the exposed surface is preferably 10 to 4,000 mW/cm$^2$, and more preferably 20 to 2,500 mW/cm$^2$.

As an actinic radiation source, a mercury lamp, a gas/solid laser, etc. are mainly used, and for UV photocuring inkjet ink composition a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses a LED that can emit actinic radiation whose wavelength is centered between 300 nm and 370 nm. Furthermore, another violet LED is available, and irradiation can be carried out with radiation of a different UV bandwidth. The actinic radiation source in the present invention is preferably a UV-LED, and a UV-LED having a peak wavelength at 340 to 400 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mW/cm$^2$.

The ink composition of the present invention is desirably exposed to such actinic radiation for preferably 0.01 to 120 sec., and more preferably 0.1 to 90 sec.

Irradiation conditions and a basic method for irradiation with actinic radiation are disclosed in JP-A-60-132767. Specifically, a light source is provided on either side of a head unit that includes an ink composition discharge device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the ink composition has landed. By controlling the time from ink composition landing to irradiation so as to be a minimum in this way, it becomes possible to prevent the ink composition that has landed on a recording medium from spreading before being cured. Furthermore, since the ink composition can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light. Such curing methods may be also applied to the inkjet recording method of the present invention.

By employing such a inkjet recording method as described above, it is possible to maintain a uniform dot diameter for landed ink composition even for various types of recording medium (support) having different surface wettability, thereby improving the image quality. In order to obtain a color image, it is preferable to superimpose colors in order from those with a high lightness. By superimposing ink compositions in order from one with high lightness, it is easy for radiation to reach a lower ink composition, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way the ink composition of the present invention may be cured by irradiation with actinic radiation in high sensitivity and form an image on the surface of the recording medium.

The inkjet recording method of the present invention may suitably employ an ink set. The order in which colored ink compositions are discharged is not particularly limited, but it is preferable to apply to a recording medium from a colored ink composition having a high lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow→cyan→magenta→black.

In the present invention, the recording medium is not particularly limited, and a recording medium known as a support and a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, polyvinyl chloride (PVC), acrylic resin, etc.), and paper or plastic film laminated or vapor-deposited with the above metal (e.g. an aluminum composite plate, etc.). In the present invention, as the recording medium, a non-absorbing recording medium may suitably be used.

As the recording medium, PVC, an acrylic resin, and an aluminum composite plate are preferable; the ink composition of the present invention has good substrate adhesion toward PVC, an acrylic resin, and an aluminum composite plate in particular.

In accordance with the present invention, there can be provided an inkjet ink composition that has excellent discharge stability and gives a cured film having excellent substrate adhesion and impact resistance, and an inkjet recording method employing the inkjet ink composition.

EXAMPLE

The present invention is explained below more specifically by reference to Examples and Comparative Examples. However, the present invention should not be construed as being limited by these Examples.

'Parts' in the description below means 'parts by weight' unless otherwise specified.

Materials used in the present invention were as follows.
IRGALITE BLUE GLVO (cyan pigment, BASF Japan)
CINQUASIA MAGENTA RT-355-D (magenta pigment, BASF Japan)
NOVOPERM YELLOW H2G (yellow pigment, Clariant)
SPECIAL BLACK 250 (black pigment, BASF Japan)
TIPAQUE CR60-2 (white pigment, Ishihara Sangyo Kaisha Ltd.)
SOLSPERSE 32000 (dispersant, Noveon)
SOLSPERSE 41000 (dispersant, Noveon)
V-CAP (N-vinylcaprolactam, ISP)
SR278 (diethylene glycol monobutyl ether acrylate, Sartomer)
SR9003 (PO-modified neopentyl glycol diacrylate, Sartomer)
SR531 (cyclic trimethylolpropane formal acrylate (CTFA), Sartomer)
SR285 (tetrahydrofurfuryl acrylate, Sartomer)
SR339 (phenoxyethyl acrylate, Sartomer)
SR256 (2-(2-ethoxyethoxy)ethyl acrylate, Sartomer)
SR506 (isobornyl acrylate, Sartomer)
CD420 (3,3,5-trimethyl cyclohexyl acrylate, Sartomer)
CD217 (4-t-butyl cyclohexyl acrylate, Sartomer)
FIRSTCURE ST-1 (polymerization inhibitor, mixture of tris (N-nitroso-N-phenylhydroxyamine)aluminum salt (10 wt %) and phenoxyethyl acrylate (90 wt %), Chem First)
IRGACURE 819 (bisacylphosphine photopolymerization initiator, BASF Japan)
IRGACURE 184 (photopolymerization initiator, 1-hydroxycyclohexyl phenyl ketone, BASF Japan)
SPEEDCURE ITX (photopolymerization initiator, isopropylthioxanthone, LAMBSON)
TEGORAD 2100 (silicone-based surfactant, Degussa)
Preparation of Cyan Mill Base A 300 parts by weight of IRGALITE BLUE GLVO, 620 parts by weight of SR339, and 80 parts by weight of SOLSPERSE 32000 were mixed by stirring, thus giving cyan mill base A. Preparation of cyan mill base A was carried out by dispersing using a Motor Mill M50 disperser (Eiger Machinery, Inc.) with zirconia beads having a diameter of 0.65 mm at a peripheral speed of 9 m/s for 4 hours.
Preparation of Magenta Mill Base B 300 parts by weight of CINQUASIA MAGENTA RT-355-D, 600 parts by weight of SR339, and 100 parts by weight of SOLSPERSE 32000 were mixed by stirring, thus giving magenta mill base B. Preparation of magenta mill base B was carried out by dispersing using a Motor Mill M50 disperser (Eiger Machinery, Inc.) with zirconia beads having a diameter of 0.65 mm at a peripheral speed of 9 m/s for 10 hours.
Preparation of Yellow Mill Base C 300 parts by weight of NOVOPERM YELLOW H2G, 600 parts by weight of SR339, and 100 parts by weight of SOLSPERSE 32000 were mixed by stirring, thus giving yellow mill base C. Preparation of yellow mill base C was carried out by dispersing using a Motor Mill M50 disperser (Eiger Machinery, Inc.) with zirconia beads having a diameter of 0.65 mm at a peripheral speed of 9 m/s for 10 hours.

Preparation of Black Mill Base D 400 parts by weight of SPECIAL BLACK 250, 520 parts by weight of SR339, and 80 parts by weight of SOLSPERSE 32000 were mixed by stirring, thus giving black mill base D. Preparation of black mill base D was carried out by dispersing using a Motor Mill M50 disperser (Eiger Machinery, Inc.) with zirconia beads having a diameter of 0.65 mm at a peripheral speed of 9 m/s for 7 hours.

Preparation of White Mill Base E 500 parts by weight of TIPAQUE CR60-2, 440 parts by weight of SR339, and 60 parts by weight of SOLSPERSE 41000 were mixed by stirring, thus giving white mill base E. Preparation of white mill base E was carried out by dispersing using a Motor Mill M50 disperser (Eiger Machinery, Inc.) with zirconia beads having a diameter of 0.65 mm at a peripheral speed of 9 m/s for 4 hours.

<Method of Preparing Ink Composition>

Ink compositions of Examples 1 to 18 and Comparative Examples 1 to 5 were obtained by mixing and stirring the materials and ratio (parts by weight) shown in Table 1.

Method for Measurement of Surface Tension

The surface tension of an ink composition was measured at 25° C. using a SIGMA 702 surface tensiometer (suspended ring method, KSV Instruments Ltd.).

Inkjet Recording Method

Inkjet images were printed in bidirectional print mode (high productivity mode) and Fineart mode (high resolution mode) using an Acuity Advance UV curing type inkjet printer (FUJIFILM Corporation). Fineart mode is printing carried out in multipass mode in which the same image area is drawn with 8 passes. The printer was equipped with UV lamp light sources at left and right positions of the head unit, and in bidirectional print mode the same image area is exposed to UV 16 times during drawing 8 times with the multiple passes.

A 100% solid image was printed on Avery Permanent 400 (polyvinyl chloride (PVC), Avery) at a resolution of 600×450 dpi with a size of 30 cm×30 cm. The lamp was equipped with SUB ZERO 085 H bulb lamp units manufactured by Integration Technology. When the exposure area illumination intensity was measured during printing it was found to be 745 mW/cm$^2$.

Method for Evaluation of Substrate Adhesion: Cross-Cut Tape Peel-Off Test

A printed material was prepared by the same method as in the description for the inkjet recording method above except that the support was changed to an aluminum composite plate (Di-bond, thickness 5 mm) or an acrylic resin (REPSOL GLASS, Repsol, thickness 22 mm).

A cross-cut tape peel-off test was carried out in accordance with ASTM D3359 DIN53 151, and evaluation was carried out using the criteria below. The higher the score, the higher the performance of the printed material, but as a level that can be handled in terms of processing suitability, etc., a rank of 2 or higher was defined as being acceptable.

5: peeled-off area of the image was less than 1%.
4: peeled-off area of the image was at least 1% but less than 5%.
3: peeled-off area of the image was at least 5% but less than 10%.
2: peeled-off area of the image was at least 10% but less than 30%.
1: peeled-off area of the image was at least 30%.

Evaluation of Curability

The degree of tackiness of an image obtained by the above-mentioned inkjet recording method was evaluated by touch using the criteria below. A rank of 3 or higher was defined as being acceptable.

5: there was no tackiness on the image.
4: there was slight tackiness on the image, but at a level that did not give any problem in practice.
3: the image was slightly tacky, but uncured ink composition or cured film did not transfer to the hand.
2: the image was slightly tacky, and uncured ink composition or cured film transferred to the hand at a slight level.
1: the image had considerable tackiness, and some uncured ink composition or cured film transferred to the hand.

Evaluation of Impact Resistance

As a method for evaluating the impact resistance of a cured film, a strike test was carried out in this example.

In the inkjet recording method, 100%, 200%, and 300% solid images were prepared, the images were rolled up and placed on a desk, and the printed materials were struck strongly by hand from above. Evaluation was carried out using the criteria below. A rank of 3 or higher was defined as being acceptable.

5: no cracks were formed in the 100%, 200%, or 300% samples.
4: no cracks were formed in the 100% or 200% samples, but cracks were formed in the image area of the 300% sample.
3: no cracks were formed in the 100% sample, but cracks were formed in the image area of 200% and 300% samples.
2: cracks were formed in the image area of all of 100%, 200%, and 300% samples.
1: large cracks were formed in all of 100%, 200%, and 300% samples such that pieces of the image flew off.

Evaluation of Image Stripe Unevenness

The stripe unevenness of an image obtained by the above-mentioned inkjet recording method was visually evaluated from points that were spaced from the image by fixed distances. The evaluation criteria were as given below. A rank of 3 or higher was defined as being acceptable.

Visual evaluation was carried out by 10 evaluators having an average eyesight of 0.8 to 1.2, and an evaluation score was determined by rounding the average value of the evaluation scores after eliminating the maximum value and the minimum value from the evaluation scores made by the 10 evaluators using the criteria below.

5: stripe unevenness could not be clearly seen by eye at a distance of 0.3 m from the image.
4: stripe unevenness could be seen by eye at a distance of 0.3 m from the image but could not be seen at a distance of 0.6 m.
3: stripe unevenness could be seen by eye at a distance of 0.6 m from the image but could not be seen at a distance of 1.0 m.
2: stripe unevenness could be seen by eye at a distance of 1.0 m from the image but could not be seen at a distance of 2.0 m.
1: stripe unevenness was clearly confirmed at a distance of 2.0 m from the image.

Evaluation of Discharge Stability (10 pL)

After the ink composition obtained was stored at room temperature for two weeks, recording on a recording medium was carried out using inkjet recording equipment having a Q-class Sapphire QS-256/10 inkjet head with a nozzle plate treated so as to have affinity for an ink (FUJIFILM Dimatix, Inc., number of nozzles 256, liquid droplet volume 10 pL, 50 kHz, ink affinity treatment: silicon oxide) with the discharged liquid droplets fixed at 10 pL, and the presence or absence of dot dropouts and ink scattering was visually examined when printing was carried out continuously for 15 minutes at normal temperature (25° C.) and evaluated using the criteria below. A rank of 3 or higher was defined as being acceptable.
5: no occurrence of dot dropouts or ink scattering
4: 1 to 3 occurrences of dot dropouts or ink scattering
3: 4 to 10 occurrences of dot dropouts or ink scattering
2: 11 to 20 occurrences of dot dropouts or ink scattering
1: 21 or more occurrences of dot dropouts or ink scattering
Evaluation of Discharge Stability (30 pL)

After the ink composition obtained was stored at room temperature for two weeks, recording on a recording medium was carried out using inkjet recording equipment having a Q-class Sapphire QS-256/30 inkjet head with a nozzle plate treated so as to have affinity for an ink (FUJIFILM Dimatix, Inc., number of nozzles 256, liquid droplet volume 30 pL, 16 kHz, ink affinity treatment: silicon oxide) with the discharged liquid droplets fixed at 30 pL, and the presence or absence of dot dropouts and ink scattering was visually examined when printing was carried out continuously for 15 minutes at normal temperature (25° C.) and evaluated using the criteria below. A rank of 3 or higher was defined as being acceptable.
5: no occurrence of dot dropouts or ink scattering
4: 1 to 3 occurrences of dot dropouts or ink scattering
3: 4 to 10 occurrences of dot dropouts or ink scattering
2: 11 to 20 occurrences of dot dropouts or ink scattering
1: 21 or more occurrences of dot dropouts or ink scattering The results of the above-mentioned evaluation are shown in Table 1. '-' in the table denotes that the component was not contained.

TABLE 1

| | | Example/Comparative Example Example | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| Pigment | IRGALITE BLUE GLVO | 2.4 | — | — | — | — | 2.4 | 2.4 | 2.4 | 2.4 | 2.4 | 2.4 | 2.4 |
| | CINQUASIA MAGENTA RT355D | — | 4.8 | — | — | — | — | — | — | — | — | — | — |
| | NOVOPERM YELLOW H2G | — | — | 3.6 | — | — | — | — | — | — | — | — | — |
| | SPECIAL BLACK 250 | — | — | — | 3.2 | — | — | — | — | — | — | — | — |
| | Tipaque CR60-2 | — | — | — | — | 15 | — | — | — | — | — | — | — |
| Dispersant | SOLSPERSE 32000 | 0.64 | 1.6 | 1.2 | 0.64 | — | 0.64 | 0.64 | 0.64 | 0.64 | 0.64 | 0.64 | 0.64 |
| | SOLSPERSE 41000 | — | — | — | — | 1.8 | — | — | — | — | — | — | — |
| Component A-1 | Diethylene glycol monobutyl ether acrylate | 10.0 | 10.0 | 10.0 | 10.0 | 10.0 | 20.0 | 25.0 | 30.0 | 10.0 | 10.0 | 10.0 | 10.0 |
| Component A-2 | Cyclic trimethylolpropane formal acrylate | 40.0 | 40.0 | 40.0 | 40.0 | 37.0 | 35.0 | 30.0 | 25.0 | — | — | — | — |
| | Isobornyl acrylate | — | — | — | — | — | — | — | — | 40.0 | — | — | — |
| | 3,3,5-Trimethylcyclohexyl acrylate | — | — | — | — | — | — | — | — | — | 40.0 | — | — |
| | 4-t-Butylcyclohexyl acrylate | — | — | — | — | — | — | — | — | — | — | 40.0 | — |
| | Phenoxyethyl acrylate | 21.96 | 16.6 | 19.2 | 21.16 | 13.2 | 16.96 | 16.96 | 16.96 | 21.96 | 21.96 | 21.96 | 61.96 |
| Component A-3 | N-Vinylcaprolactam | 15.0 | 15.0 | 15.0 | 15.0 | 15.0 | 15.0 | 15.0 | 15.0 | 15.0 | 15.0 | 15.0 | 15.0 |
| | Tetrahydrofurfuryl acrylate | — | — | — | — | — | — | — | — | — | — | — | — |
| Other polymerizable compound | PO-modified neopentylglycol diacrylate | 1.9 | 3.9 | 2.9 | — | 0.9 | 1.9 | 1.9 | 1.9 | 1.9 | 1.9 | 1.9 | 1.9 |
| | 2-(2-Ethoxyethoxy)ethyl acrylate | — | — | — | — | — | — | — | — | — | — | — | — |
| Component B | IRGACURE 819 | 4.0 | 4.0 | 4.0 | 4.0 | 4.0 | 4.0 | 4.0 | 4.0 | 4.0 | 4.0 | 4.0 | 4.0 |
| | IRGACURE 184 | 3.0 | 3.0 | 3.0 | 3.0 | 3.0 | 3.0 | 3.0 | 3.0 | 3.0 | 3.0 | 3.0 | 3.0 |
| | SPEEDCURE ITX | 1.0 | 1.0 | 1.0 | 2.9 | — | 1.0 | 1.0 | 1.0 | 1.0 | 1.0 | 1.0 | 1.0 |

TABLE 1-continued

| | | | | | | | | | | | | | |
|---|---|---|---|---|---|---|---|---|---|---|---|---|---|
| Polymerization inhibitor | FIRSTCURE ST-1 | 0.1 | 0.1 | 0.1 | 0.1 | 0.1 | 0.1 | 0.1 | 0.1 | 0.1 | 0.1 | 0.1 | 0.1 |
| Surfactant | TEGORAD 2100 | — | — | — | — | — | — | — | — | — | — | — | — |
| | Total weight [wt %] | 100.0 | 100.0 | 100.0 | 100.0 | 100.0 | 100.0 | 100.0 | 100.0 | 100.0 | 100.0 | 100.0 | 100.0 |
| | Component A-1 to A-3 total content [wt %] | 87.0 | 81.6 | 84.2 | 86.2 | 75.2 | 87.0 | 87.0 | 87.0 | 87.0 | 87.0 | 87.0 | 87.0 |
| | Ink composition surface tension [mN/m] 25° C. | 37.3 | 37.5 | 37.2 | 37.6 | 37.4 | 37.4 | 37.5 | 37.6 | 33.1 | 33.5 | 33.4 | 39.0 |
| Evaluation results | Discharge stability (10 pL) QS-256/10 | 5 | 5 | 5 | 5 | 5 | 5 | 5 | 5 | 4 | 4 | 4 | 5 |
| | Discharge stability (30 pL) QS-256/30 | 5 | 5 | 5 | 5 | 5 | 5 | 5 | 5 | 3 | 3 | 3 | 5 |
| | Substrate adhesion PVC | 5 | 5 | 5 | 5 | 5 | 5 | 5 | 5 | 4 | 4 | 4 | 5 |
| | Acrylic resin | 5 | 5 | 5 | 5 | 5 | 5 | 5 | 5 | 4 | 4 | 4 | 5 |
| | Aluminum composite plate | 5 | 5 | 5 | 5 | 5 | 5 | 5 | 5 | 5 | 5 | 5 | 5 |
| | Curablility | 5 | 5 | 5 | 5 | 5 | 5 | 5 | 4 | 4 | 4 | 4 | 5 |
| | Impact resistance | 5 | 5 | 5 | 5 | 5 | 5 | 5 | 5 | 4 | 4 | 4 | 5 |
| | Image stripe unevenness | 5 | 5 | 5 | 4 | 5 | 5 | 5 | 5 | 5 | 5 | 4 | 4 |

| | | Example/Comparative Example | | | | | | | | | | |
|---|---|---|---|---|---|---|---|---|---|---|---|---|
| | | Example | | | | | | Comparative Example | | | | |
| | | 13 | 14 | 15 | 16 | 17 | 18 | 1 | 2 | 3 | 4 | 5 |
| Pigment | IRGALITE BLUE GLVO | 2.4 | 2.4 | 2.4 | 2.4 | 2.4 | 2.4 | 2.4 | 2.4 | 2.4 | 2.4 | 2.4 |
| | CINQUASIA MAGENTA RT355D | — | — | — | — | — | — | — | — | — | — | — |
| | NOVOPERM YELLOW H2G | — | — | — | — | — | — | — | — | — | — | — |
| | SPECIAL BLACK 250 | — | — | — | — | — | — | — | — | — | — | — |
| | Tipaque CR60-2 | — | — | — | — | — | — | — | — | — | — | — |
| Dispersant | SOLSPERSE 32000 | 0.64 | 0.64 | 0.64 | 0.64 | 0.64 | 0.64 | 0.64 | 0.64 | 0.64 | 0.64 | 0.64 |
| | SOLSPERSE 41000 | — | — | — | — | — | — | — | — | — | — | — |
| Component A-1 | Diethylene glycol monobutyl ether acrylate | 10.0 | 10.0 | 10.0 | 10.0 | 10.0 | 10.0 | — | 10.0 | 10.0 | — | 10.0 |
| Component A-2 | Cyclic trimethylolpropane formal acrylate | 57.0 | 40.0 | 40.0 | 40.0 | 30.0 | 15.0 | 40.0 | — | 40.0 | 40.0 | 15.0 |
| | Isobornyl acrylate | — | — | — | — | — | — | — | — | — | — | — |
| | 3,3,5-Trimethylcyclohexyl acrylate | — | — | — | — | — | — | — | — | — | — | — |
| | 4-t-Butylcyclohexyl acrylate | — | — | — | — | — | — | — | — | — | — | — |
| | Phenoxyethyl acrylate | 4.96 | 21.96 | 21.91 | 21.66 | 21.96 | 21.96 | 31.96 | 21.96 | 36.96 | 21.96 | 11.96 |
| Component A-3 | N-Vinylcaprolactam | 15.0 | — | 15.0 | 15.0 | 15.0 | 15.0 | 15.0 | 15.0 | — | 15.0 | 15.0 |
| | Tetrahydrofurfuryl acrylate | — | 15.0 | — | — | — | — | — | — | — | — | — |
| Other polymerizable compound | PO-modified neopentylglycol diacrylate | 1.9 | 1.9 | 1.9 | 1.9 | 11.9 | 26.9 | 1.9 | 41.9 | 1.9 | 1.9 | 36.9 |
| | 2-(2-Ethoxyethoxy)ethyl acrylate | — | — | — | — | — | — | — | — | — | 10.0 | — |
| Component B | IRGACURE 819 | 4.0 | 4.0 | 4.0 | 4.0 | 4.0 | 4.0 | 4.0 | 4.0 | 4.0 | 4.0 | 4.0 |

TABLE 1-continued

| | | | | | | | | | | | | |
|---|---|---|---|---|---|---|---|---|---|---|---|---|
| | IRGACURE 184 | 3.0 | 3.0 | 3.0 | 3.0 | 3.0 | 3.0 | 3.0 | 3.0 | 3.0 | 3.0 | 3.0 |
| | SPEEDCURE ITX | 1.0 | 1.0 | 1.0 | 1.0 | 1.0 | 1.0 | 1.0 | 1.0 | 1.0 | 1.0 | 1.0 |
| Polymerization inhibitor | FIRSTCURE ST-1 | 0.1 | 0.1 | 0.1 | 0.1 | 0.1 | 0.1 | 0.1 | 0.1 | 0.1 | 0.1 | 0.1 |
| Surfactant | TEGORAD 2100 | — | — | 0.05 | 0.3 | — | — | — | — | — | — | — |
| | Total weight [wt %] | 100.0 | 100.0 | 100.0 | 100.0 | 100.0 | 100.0 | 100.0 | 100.0 | 100.0 | 100.0 | 100.0 |
| | Component A-1 to A-3 total content [wt %] | 87.0 | 87.0 | 86.9 | 86.7 | 77.0 | 62.0 | 87.0 | 47.0 | 87.0 | 77.0 | 52.0 |
| | Ink composition surface tension [mN/m] 25° C. | 36.1 | 36.9 | 30.2 | 27.6 | 37.3 | 37.3 | 37.5 | 34.5 | 38.0 | 36.9 | 37.3 |
| Evaluation results | Discharge stability QS-256/10 (10 pL) | 5 | 5 | 4 | 3 | 5 | 5 | 4 | 5 | 5 | 3 | 5 |
| | Discharge stability QS-256/30 (30 pL) | 4 | 5 | 3 | 3 | 5 | 5 | 4 | 5 | 5 | 2 | 5 |
| | Substrate adhesion PVC | 5 | 5 | 5 | 5 | 4 | 4 | 5 | 4 | 2 | 5 | 3 |
| | Acrylic resin | 5 | 5 | 5 | 5 | 4 | 3 | 4 | 1 | 1 | 3 | 1 |
| | Aluminum composite plate | 5 | 5 | 5 | 5 | 4 | 3 | 3 | 1 | 1 | 5 | 1 |
| | Curability | 5 | 4 | 5 | 5 | 5 | 5 | 5 | 5 | 3 | 5 | 5 |
| | Impact resistance | 4 | 5 | 5 | 5 | 4 | 3 | 2 | 2 | 5 | 3 | 2 |
| | Image stripe unevenness | 5 | 5 | 5 | 5 | 4 | 3 | 5 | 4 | 4 | 5 | 3 |

What is claimed is:

1. An inkjet ink composition comprising at least:
(Component A-1) diethylene glycol monobutyl ether acrylate;
(Component A-2) at least one compound selected from the group consisting of cyclic trimethylolpropane formal acrylate, phenoxyethyl acrylate, isobornyl acrylate, 3,3,5-trimethylcyclohexyl acrylate, and 4-t-butylcyclohexyl acrylate;
(Component A-3) an N-vinyllactam and/or tetrahydrofurfuryl acrylate; and
(Component B) a polymerization initiator,
Component A-1 having a content of 1 to 35 wt % of the entire ink composition, and
Components A-1 to A-3 having a total content of 60 to 90 wt % of the entire ink composition,
wherein the composition has a surface tension at 25° C. of 36.0 to 39.0 mN/m.

2. The inkjet ink composition according to claim 1, wherein it comprises at least a bisacylphosphine compound and/or a thioxanthone compound as Component B.

3. The inkjet ink composition according to claim 1, wherein it comprises a bisacylphosphine compound and a thioxanthone compound as Component B.

4. The inkjet ink composition according to claim 1, wherein it has a content ratio by weight of Component A-1 and Component A-2 of 1:1 to 1:8.

5. The inkjet ink composition according to claim 1, wherein it comprises cyclic trimethylolpropane formal acrylate as Component A-2.

6. The inkjet ink composition according to claim 1, wherein it comprises cyclic trimethylolpropane formal acrylate and phenoxyethyl acrylate as Component A-2.

7. The inkjet ink composition according to claim 1, wherein it comprises N-vinylcaprolactam as Component A-3.

8. The inkjet ink composition according to claim 6, wherein it comprises N-vinylcaprolactam as Component A-3.

9. The inkjet ink composition according to claim 1, wherein Component A-1 has a content of 3 to 25 wt % of the entire ink composition.

10. The inkjet ink composition according to claim 1, wherein Component A-2 has a content of 20 to 80 wt % of the entire ink composition.

11. The inkjet ink composition according to claim 9, wherein Component A-2 has a content of 20 to 80 wt % of the entire ink composition.

12. The inkjet ink composition according to claim 1, wherein Component A-3 has a content of 5 to 35 wt % of the entire ink composition.

13. The inkjet ink composition according to claim 11, wherein Component A-3 has a content of 5 to 35 wt % of the entire ink composition.

14. The inkjet ink composition according to claim 1, wherein it further comprises a difunctional (meth)acrylate having a hydrocarbon chain having at least 5 carbons.

15. The inkjet ink composition according to claim 8, wherein it further comprises a difunctional (meth)acrylate having a hydrocarbon chain having at least 5 carbons.

16. An inkjet recording method comprising:
($a^1$) a step of discharging the inkjet ink composition according to claim 1 onto a recording medium; and
($b^1$) a step of curing the inkjet ink composition by irradiating the discharged inkjet ink composition with actinic radiation.

17. The inkjet recording method according to claim 16, wherein polyvinyl chloride, an acrylic resin, or an aluminum composite plate is used as the recording medium.

* * * * *